US012217588B2

(12) United States Patent
Newell et al.

(10) Patent No.: US 12,217,588 B2
(45) Date of Patent: Feb. 4, 2025

(54) SYSTEMS AND METHODS FOR LOCATING DISCARDED TRACKING DEVICES

(71) Applicant: BI Incorporated, Boulder, CO (US)

(72) Inventors: Joseph P. Newell, Louisville, CO (US); Michael Cooke, Highlands Ranch, CO (US); Arthur P. Newsome, Arvada, CO (US); Alan L. Soxman, Thornton, CO (US); Manit Guragain, Thornton, CO (US); Todd M. Bloemendaal, Westminster, CO (US)

(73) Assignee: BI Incorporated, Boulder, CO (US)

( * ) Notice: Subject to any disclaimer, the term of this patent is extended or adjusted under 35 U.S.C. 154(b) by 59 days.

(21) Appl. No.: 18/098,816

(22) Filed: Jan. 19, 2023

(65) Prior Publication Data

US 2023/0267813 A1 Aug. 24, 2023

Related U.S. Application Data

(60) Provisional application No. 63/312,167, filed on Feb. 21, 2022.

(51) Int. Cl.
G08B 21/02 (2006.01)
G06F 1/3209 (2019.01)
G08B 7/06 (2006.01)

(52) U.S. Cl.
CPC ........... G08B 21/023 (2013.01); G08B 21/02 (2013.01); G08B 21/0233 (2013.01); *G06F 1/3209* (2013.01); *G08B 7/06* (2013.01)

(58) Field of Classification Search
CPC .... G08B 21/00; G08B 21/02; G08B 21/0272; G08B 21/0286; G08B 21/22; G08B 23/00; G08B 7/06; G08B 21/023; G08B 21/0233; G08B 21/0236; G08B 21/0238; H04Q 7/00; H04W 4/02; H04W 4/029; H04W 4/80; G06F 1/3209; G06F 16/29
See application file for complete search history.

(56) References Cited

U.S. PATENT DOCUMENTS

| 2008/0316022 A1* | 12/2008 | Buck | G08B 21/22 340/539.13 |
| 2019/0380007 A1* | 12/2019 | Mahmoud | H04W 4/80 |
| 2020/0128482 A1* | 4/2020 | Daoura | H04W 4/80 |

OTHER PUBLICATIONS

NPL Search (May 14, 2024).*

* cited by examiner

*Primary Examiner* — Van T Trieu
(74) *Attorney, Agent, or Firm* — Osha Bergman Watanabe & Burton LLP

(57) ABSTRACT

Various embodiments provide systems and methods for locating and aiding in the recovery of discarded tracking devices.

20 Claims, 5 Drawing Sheets

SYSTEMS AND METHODS FOR LOCATING DISCARDED TRACKING DEVICES

CROSS REFERENCE TO RELATED APPLICATION

The present application claims priority to U.S. Provisional Patent Application No. 63/312,167 entitled "Systems and Methods for Identifying Discarded Tracking Devices", and filed Feb. 21, 2022 by Newell. The entirety of the aforementioned application is incorporated herein by reference for all purposes.

BACKGROUND

Various embodiments provide systems and methods for locating and aiding in the recovery of discarded tracking devices.

Large numbers of individuals are currently monitored as part of parole requirements or other requirements. Such monitoring relies upon attaching a tracking device to the monitored individual that provides location and other status information about the monitored individual. In some cases, monitored individuals may remove and discard the monitoring device. As such monitoring devices are expensive, such losses of monitoring devices through discard increases the costs of running a monitoring system.

Thus, for at least the aforementioned reasons, there exists a need in the art for more advanced approaches, devices and systems for finding discarded monitoring devices.

BRIEF SUMMARY

Various embodiments provide systems and methods for locating and aiding in the recovery of discarded tracking devices.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION

Figure 1A:
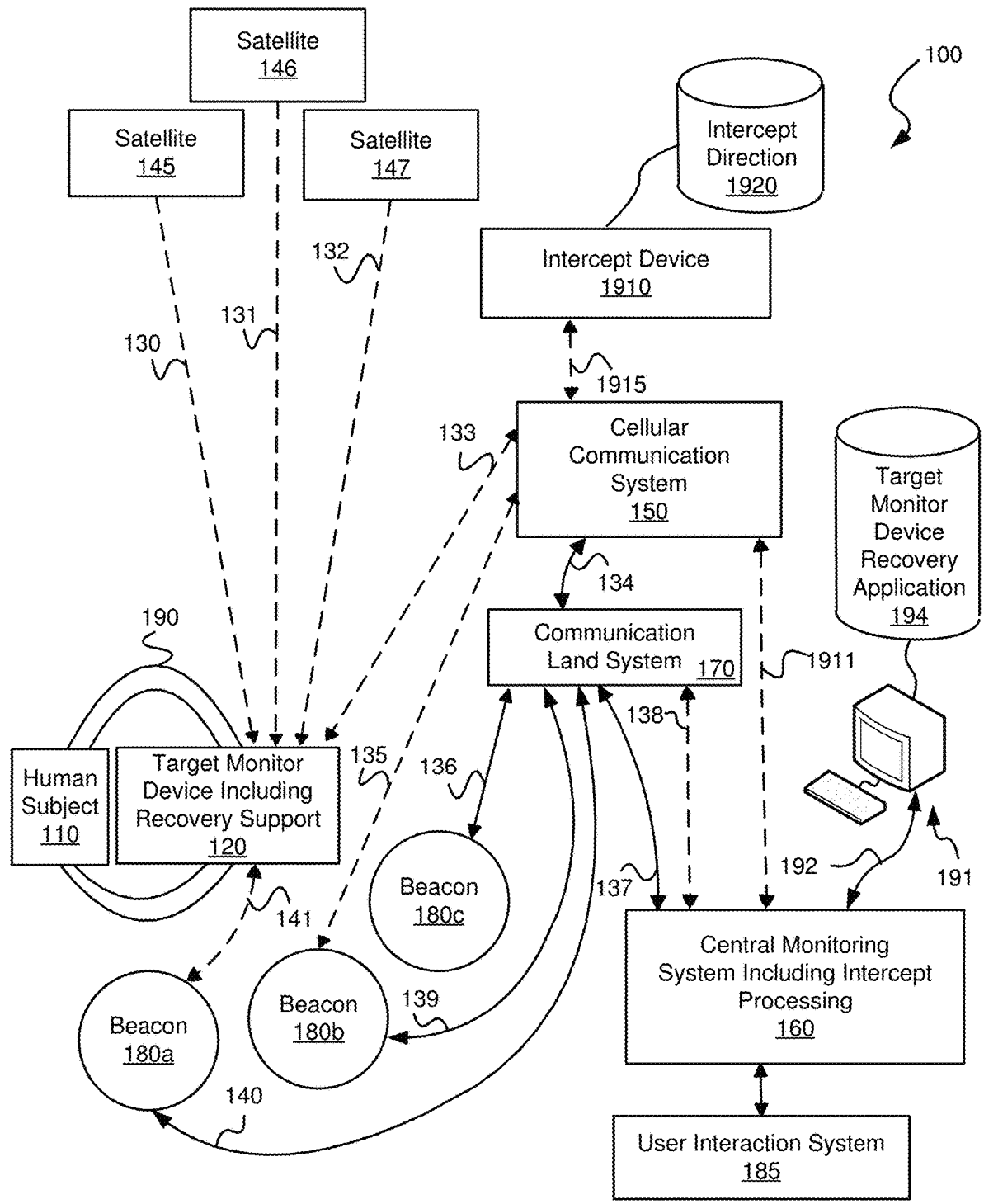
FIG. 1a is a block diagram illustrating a monitoring system including a target monitor device recovery application in accordance with various embodiments.

Various embodiments provide systems and method for supporting target intercept directing.

Tracking of individuals using attached tracking devices includes considerable costs including, but not limited to, the actual tracking device. It is not uncommon for a monitored individual to remove the tracking device without permission and discard it. As such tracking devices have only a limited battery life, it is often the case that the batteries in the tracking device will be exhausted before the tracking device is found. In such a situation, unless the party attempting to recover the tracking device knows the last location of the tracking device with substantial precision, it is likely the tracking device will never be recovered and result in a loss to the party overseeing the tracking device. Various systems and methods discussed herein operate to preserve the battery of the tracking device until a time when a party attempting to recover the tracking device is available and/or in position to make a recovery.

Various embodiments provide methods for recovering a discarded tracking device. Such methods include: receiving, by a target monitor device, a message including a defined wake-up time; storing, by the target monitor device, the defined wake-up time; entering, by the target monitor device, a low level power mode, where in the low level power mode the target monitor device maintains a timer; and upon the timer indicating the defined wake-up time has arrived, causing an alert circuit to generate an alert signal. In some instances of the aforementioned embodiments, the alert circuit includes a speaker, and the alert signal is an audio signal. In various instances of the aforementioned embodiments, the alert circuit includes a light, and the alert signal is a visual signal. In some instances of the aforementioned embodiments, the alert circuit includes both a speaker and a light, and the alert signal includes both a visual signal and an audio signal.

In some instances of the aforementioned embodiments, the methods further include: periodically transitioning, by the target monitor device, from the low level power mode to another power mode; and while in the other power mode, receiving, by the target monitor device, messages from a central monitoring system. In some such instances, the messages from the central monitoring system include the message including a defined wake-up time. In various such instances, a period at which the target monitor device transitions from the low level power mode to the other power mode is selected from a group consisting of: twenty-four hours, and four hours.

In various instances of the aforementioned embodiments, the methods further include: receiving, by a processing resource, a request for target monitor device recovery at a central monitoring station, where the request for target monitor device recovery includes the defined wake-up time; and sending, by the processing resource, the message including the defined wake-up time to the target monitor device.

Other embodiments provide systems for recovering a discarded tracking device. Such systems include a target monitor device. The target monitor device includes: a processing resource, an alert circuit; and a non-transitory computer readable medium coupled to the processing resource.

The non-transitory computer readable medium has stored thereon instructions that when executed by the processing resource cause the processing resource to: receive a message including a defined wake-up time; store the defined wake-up time; enter a low level power mode, where in the low level power mode the target monitor device maintains a timer; and upon the timer indicating the defined wake-up time has arrived, causing the alert circuit to generate an alert signal.

Yet other embodiments provide systems for recovering a discarded tracking device that include a central monitoring system and a target monitor device. The central monitoring system includes: a first processing resource, and a first non-transitory computer readable medium coupled to the first processing resource. The first non-transitory computer readable medium has stored thereon instructions that when executed by the first processing resource cause the first processing resource to: receive a request for target monitor device recovery, wherein the request for target monitor device recovery includes a defined wake-up time; and send a message including the defined wake-up time to a target monitor device. The target monitor device includes: a second processing resource, an alert circuit, and a second non-transitory computer readable medium coupled to the second processing resource. The second non-transitory computer readable medium has stored thereon instructions that when executed by the second processing resource cause the second processing resource to: receive the message including the defined wake-up time; store the defined wake-up time; enter a low level power mode, wherein in the low level power mode the target monitor device maintains a timer; and upon the timer indicating the defined wake-up time has arrived, transition to another power mode that includes causing the alert circuit to generate an alert signal.

In some instances of the aforementioned embodiments, the first non-transitory computer readable medium further has stored thereon instructions that when executed by the first processing resource cause the first processing resource to: repeatedly send the message including the defined wake-up time to the target monitor device until a confirmation of receipt is received from the target monitor device. In other instances of the aforementioned embodiments, the first non-transitory computer readable medium further has stored thereon instructions that when executed by the first processing resource cause the first processing resource to: repeatedly send the message including the defined wake-up time to the target monitor device until either: (a) a confirmation of receipt is received from the target monitor device, or (b) a time derived from the defined wake-up time has passed.

Turning to FIG. 1a, a monitoring system 100 including a tracking device recovery application 194 is shown in accordance with various embodiments. Monitoring system 100 may be tailored for tracking human subjects, however, it should be noted that various implementations and deployments of monitoring system 100 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 100 is tailored for tracking delivery vehicles. Based upon the disclosure provided herein, one of ordinary skill in the art will recognize a variety of individuals, animals and/or assets that may be monitored in accordance with different embodiments, and/or different monitoring scenarios or systems that may be modified to incorporate one or more features disclosed herein.

Monitoring system 100 includes, but is not limited to, a target monitor device 120 that is physically coupled to a human subject 110 by a securing device 190. In some cases, securing device 190 is a strap that includes a tamper sensor 151 that may be, but is not limited to, a continuity sensor that when broken indicates an error or tamper condition. Further, in some cases, tamper sensor 151 may be implemented to include input from a proximity sensor 152 that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor device 120 or securing device 190 to allow for detection of removal of target monitor device 120 or other improper or unexpected meddling with target monitor device 120. Further, based upon the disclosure provided herein, one of ordinary skill in the art will recognize a variety of monitor devices and/or securing devices that may be appropriate where the target of the monitoring is not a human or other animal subject, but rather an asset.

Target monitor device 120 is designed to provide the location of human subject 110 under a number of conditions. For example, when target monitor device 120 is capable of receiving wireless satellite location information 130, 131, 132 from a sufficient number of satellites 145, 146, 147 respectively, target monitor device 120 may use the received wireless satellite location information to calculate or otherwise determine the location of human subject 110. Alternatively, or in addition, the location of a beacon 180 that is local to target monitor device 120 may be used as the location of target monitor device 120. As yet another alternative, a number of WiFi access points (not shown) may be used to triangulate the location of monitor device 120. Alternatively, or in addition, other types of earth-based triangulation may be used in accordance with different embodiments. Based on the disclosure provided herein, one of ordinary skill in the art will recognize other types of earth-based triangulation that may be used.

As yet another alternative, a cellular-based fix may be established based on signals between target monitor device 120 and a cellular communication system 150. Furthermore, when wireless communication link 133 between target monitor device 120 and cellular communications system 150 is periodically established, at those times, target monitor device 120 may report status and other stored records including location fixes to a central monitoring system 160 via wireless communication link 1911.

Monitoring system 100 may include, but is not limited to, at least one beacon 180. Beacons 180 are instrumental for beacon-based monitoring systems. Within FIG. 1a, a telemetric wireless link 141 has been depicted between beacon 180a and target monitor device 120. Each beacon 180 has an adjustable range to make telemetric wireless contact with target monitor device 120. At any point in time, depending on each beacon's 180 relative distance to target monitor device 120, none, one, or more than one tracking beacons 180 may be within transmission range of a single target monitor device 120. Likewise, it is further conceivable under various circumstances that more than one target monitor device 120 at times be within in range of a solitary beacon 180.

Telemetric wireless communications path 141 established at times between tracking beacon 180a and target monitor device 120 illustrates a common feature of various different embodiments. Some embodiments vary on how (e.g., protocol), and what information and/or signaling is passed over wireless link 141. For example, in more simplified configurations and embodiments, each beacon 180 is limited to repetitively transmitting its own beacon ID and physical location information. In that way, once target monitor device 120 is within transmission range of tracking beacon 180*a* and establishes wireless or wired reception 140, then target monitor device 120 can record and store received beacon ID and location information. At a later time, for some embodiments, target monitor device 120 can then report recorded readings from beacons 180 to the central monitoring system 160 over the cellular communication system 150 using wireless links 133 and 1911 as depicted in FIG. 1*a*. Furthermore, many embodiments allow for such transmissions and information passing to occur without being noticed by human subject 110, and unnoticed, automatically, and near effortlessly central monitoring system 160 is able to establish records and track human subject 110's movements and whereabouts.

In other embodiments or configurations, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate. Various other details about a beacon-based system are disclosed in U.S. patent application Ser. No. 12/041,746 entitled "Beacon Based Tracking Devices and Methods for Using Such" and filed Mar. 4, 2008 by Buck et al. The entirety of the aforementioned reference is incorporated herein by reference for all purposes.

Likewise, in some other embodiments, each target monitor device 120 contains a variety of power status, tampering, shielding, movement, and/or other sensors related to its own device health. While still further embodiments also include a number of other measurement transducers within target monitor device 120 for extracting information, and for later reporting, related to physical properties of human subject 110. For example, measuring for the presence of alcohol and/or other drugs present in human subject 110 may be included in some embodiments of target monitor device 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Beacons 180 in alternative embodiments may communicate with central monitoring system 160 independently of target monitor device 120. The monitoring system 100 illustrated in FIG. 1*a* shows beacon 180*b* having both a wireless communication link 135 with cellular communication system 150, and also illustrates beacon 180*b* having a hardwired communication link 139 with land communication system 170. Monitoring system 100 is also shown with beacons 180*a*, 180*b*, and 180*c* each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments, beacons 180 are located in areas frequented by human subject 110 where target monitor device 120 is incapable of accessing information from the GPS system. Such beacons eliminate the need to perform an earth-based location process and avoid the costs associated therewith. As an example, human subject 110 may have a tracking beacon 180 placed within his home, and one also placed at his place of employment in close proximity to his work area. In this way, the two placed beacons, each at different prescribed times, can interact with his attached target monitor device 120 to periodically make reports to central monitoring system 160 to track movements and the whereabouts of human subject 110. All this can be done without incurring the costs associated with, for example, triangulating using WiFi access points.

Monitoring system 100 further includes a control station 191 that is communicably coupled to central monitoring system 160 via a communication link 192. In one particular embodiment, control station 191 is a personal computer including a display device, a processor, and/or one or more I/O devices. Based upon the disclosure provided herein, one of ordinary skill in the art will recognize a variety of systems that may be used as control station 191 including highly tailored application specific control systems. A storage medium 194 is communicably coupled to control station 191 and maintains instructions governing the operation of recovery of a target monitor device (in the form of a target monitor device recovery application) processing in relation to central monitoring system 160 and target monitor device 120.

Central monitoring system 160 includes functionality for sending alerts to a user interaction system 185 when a target monitor device 120 ventures into a prohibited zone as updated by the adaptive zone update control, for providing location information indicating a location of target monitor device 120, and/or when target monitor device 120 believes it has been discarded. In such a situation where target monitor device 120 believes it has been discarded, target monitor device 120 sends its last location and in indication that it is entering a low level sleep mode as part of a target monitor device recovery protocol. Various implementations and/or aspects of the aforementioned target monitor device recovery protocol are more fully described below in relation to FIGS. 3-4 below.

User interaction system 185 may be, but is not limited to, a law enforcement computer deployed at a dispatch station of the law enforcement facility or a hand held computer maintained by a law enforcement official. As used herein, the term "computer" is used in its broadest sense to be any device or system including a processor capable of executing software and/or firmware instructions. The term "hand held computer" is used in its broadest sense to mean any portable computer with a mobile power source such as, for example, a battery. As just some examples, a hand held computer may be, but is not limited to, a smart phone, a laptop computer, or a tablet computer. Based upon the disclosure provided herein, one of ordinary skill in the art will recognize a variety of user interaction systems 185 that may be used in relation to one or more of the embodiments discussed herein. Further, it should be noted that such a system is not limited to use in relation to law enforcement.

In operation, where a target monitor device recovery is desired, a requester uses user interaction system 185 to enter request for target monitor device recovery. The request for target monitor device recovery includes an indication of the particular target monitor device and a time when the user plans to be in the area of the last reported location of target monitor device 120. This request is provided from user interaction system 185 to central monitoring system 160. Central monitoring system 160 communicates a "help find message" to the identified target monitor device 120. The help find message includes a request to wake-up at the time indicated in the request for target monitor device recovery.

Having sent the help find message, central monitoring system 160 determines whether the time indicated in the request for target monitor device recovery has passed. Where the time indicated in the request for target monitor device recovery has passed, it is too late to meaningfully use the alert functionality of target monitor device 120. As such, a message is communicated to the requester from central monitoring system 160 indicating the failure to communicate the defined wake-up time to target monitor device 120 before the defined wake-up time, and the help find message to target monitor device 120 is de-queued (i.e., not resent to target monitor device 120).

Alternatively, where the time indicated in the request for target monitor device recovery has not passed, central monitoring system 160 determines whether a confirmation of the help find message has been received from target monitor device 120. Where the confirmation has not been received, central monitoring system 160 re-sends the help find message. Alternatively, where the a confirmation of the help find message has been received from target monitor device 120, central monitoring system 160 communicates to the requester indicating that target monitor device 120 should generate an audio and/or visual alert at the time indicated in the request for target monitor device recovery. At this juncture, the help find message to target monitor device 120 is de-queued (i.e., not resent to target monitor device 120).

Figure 1B:
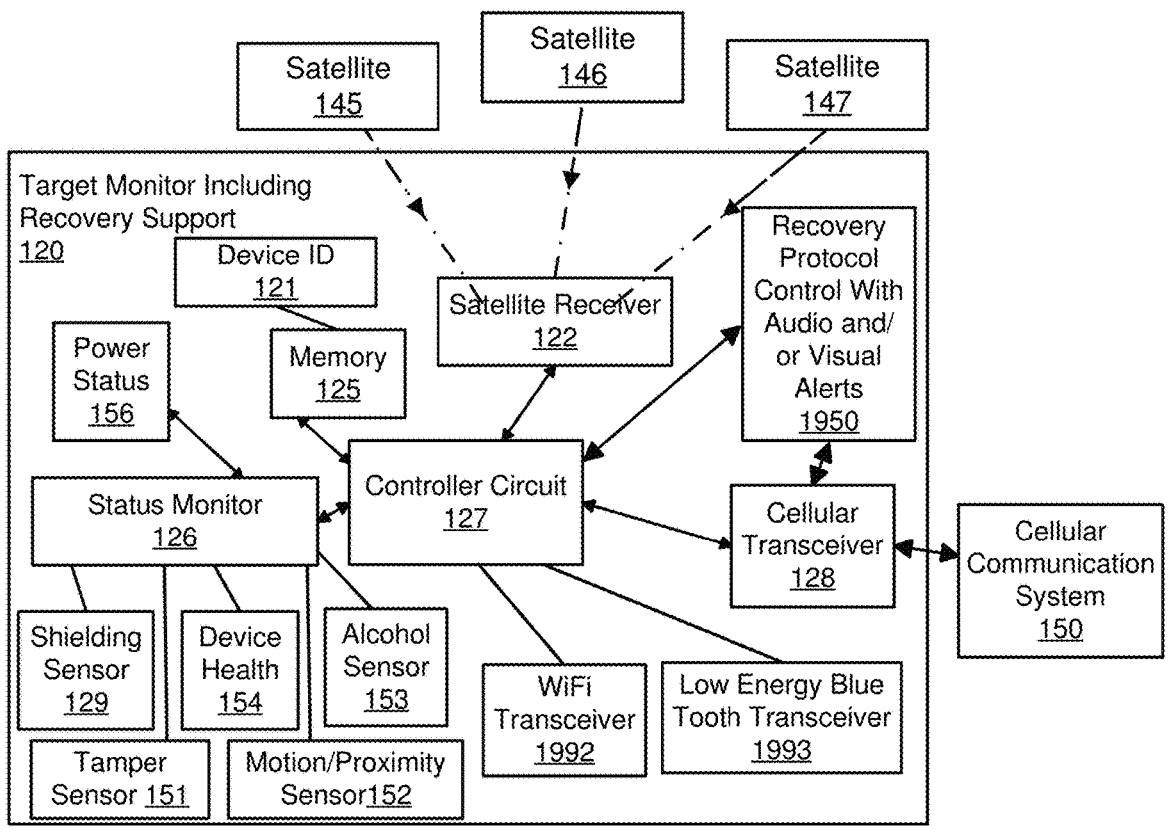
FIG. 1b is a block diagram of a target monitor device including intercept processing support in accordance with one or more embodiments.

Turning to FIG. 1b, a block diagram of target monitor device 120 including intercept processing support is shown in accordance with various embodiments. As shown, target monitor device 120 includes a device ID 121 that may be maintained in a memory 125, and thus is accessible by a controller circuit 127. Controller circuit 127 is able to interact with a satellite receiver 122 and memory 125 at times for storing and generating records of successively determined satellite-based locations. Satellite receiver 122 may be any receiving device capable of calculating or otherwise discerning the location of target monitor device using location information from one or more satellites 145, 146, 147.

Target monitor device 120 includes a recovery protocol control 1950. When target monitor device 120 triggers the target monitor device recovery protocol, a recovery protocol control 1950 operates to determine when an audio and/or visual alert will be deployed to aid in recovery. In some embodiments, recovery protocol control 1950 is a combination of a software module and hardware alert circuits. The software module includes instructions executable by controller circuit 127 to perform a recovery support function discussed below. The hardware alert circuits include one or both of an audio alert circuit and/or a visual alert circuit. The audio alert circuit may be, for example, an audio speaker and driver that when engaged plays a distinct sound. A visual alert circuit may be, for example, a light or group of lights and driver that are energized when engaged emit light. Based upon the disclosure provided herein, one of ordinary skill in the art will recognize a variety of audio and/or visual alerts that may be incorporated in target monitor 120.

In operation, recovery protocol control 1950 determines whether target monitor device 120 has been detached from a monitored individual (i.e., human subject 110). This may be determined based upon one or more status sensors included in the target monitor device. In one embodiment, a monitoring device is considered detached and discarded when the target monitor device has not moved for a defined period and that prior to the defined period a tamper sensor had reported tampering. Based upon the disclosure provided herein, one of ordinary skill in the art will recognize a variety of sensor outputs and/or combinations thereof that may be used to indicate detachment and/or discarding of the target monitor device.

Once it is determined that the target monitor device has been detached/discarded, recovery protocol control 1950 causes target monitor 120 device to send a message to central monitoring stations 160 that reports the last known location of target monitor device 120, and an indication that target monitor devices 120 is entering a low level sleep mode. This last location may be that which was calculated, for example, based upon information from satellites 145, 146, 147. Alternatively, this last location may be that which was calculated based upon beacons or WiFi signals. This last location information is transmitted to a central monitoring system along with the various status (e.g., a tamper and/or lack of movement) that was used to establish that the target monitor device had been discarded and other information identifying the target monitor device.

The low level sleep mode is a power saving mode where all but functionality necessary to recover the target monitor device is turned off. In one embodiment, in the low level sleep mode only a timer and a wake-up circuit remain operational. The timer and a wake-up application/circuit are used to periodically raise the low level sleep mode to a medium level sleep mode as more fully described below. In one particular embodiment, the timer and a wake-up application/circuit cause the target monitor device to transition from the low level sleep mode to the medium level sleep mode upon expiration of a defined wake-up period (e.g., once every twenty-four hours or once every four hours); or from the low level sleep mode to a high level sleep mode when a defined wake-up time has arrived. Based upon the disclosure provided herein, one of ordinary skill in the art will recognize a variety of defined wake-up periods that may be used to transition from the low level sleep mode to the medium level sleep mode. The medium level sleep mode energizes message receiving and processing functionality of the target monitor device such that a message indicating a time in the future when the target monitor device is to awake and generate audio and/or visual alerts as more fully described below. The high level sleep mode energizes the capability of the medium level sleep mode and in addition energizes audio and/or alert functionality such that audio and/or visual alerts are generated by the target monitor device.

In addition to sending the last location, recovery protocol control 1950 causes target monitor device 120 to set the defined wake-up time to NULL. With the defined wake-up time set to NULL, the target monitor device will not transition from the low level sleep mode to the high level sleep mode.

Once the last location has been sent and the defined wake-up time set to NULL recovery protocol control 1950 causes target monitor device 120 to enter the low level sleep mode (block 308). Again, when in the low level sleep mode, almost all functions of the target monitor device are disabled to preserve battery power. One of the only functions that remain operational in the low level sleep mode is the timer and wake-up application/circuit designed to wake the target monitor device up from the low level sleep mode upon expiration of the defined wake-up period or at the defined wake-up time.

The timer and wake-up application/circuit of recovery protocol control 1950 periodically determines whether the defined wake-up period has expired. Once the defined wake-up period has expired, recovery protocol control 1950 causes target monitor device 120 to transition from the low level sleep mode to the medium level sleep mode. Alternatively, where the defined wake-up period has not expired, the timer and wake-up application/circuit of recovery protocol control 1950 determines whether the defined wake-up time has arrived. Where the defined wake-up time is set to NULL, it is never achieved. Where neither the defined wake-up period has expired nor the defined wake-up time has arrived, recovery protocol control 1950 causes target monitor device to be maintained in the low-level sleep mode.

Otherwise, where the defined wake-up period has expired, recovery protocol control 1950 causes target monitor device to enter the medium level sleep mode. In this medium level sleep mode, target monitor device 120 is capable of updating its location and does so. In addition, target monitor device 120 sends a message indicating the updated location to central monitoring system 160 where the updated location has changed significantly from the last sent location, and receives any previously queued messages from central monitoring system 160. Such queued messages may be, for example, sent from central monitoring system 160 that repeatedly attempts to send the messages until a receipt confirmation is received back from the monitoring station. Once target monitor device 120 receives the message(s) it sends a confirmation to the central monitoring station indicating receipt of the message. In some cases, this confirmation is sent along with an updated location of the target monitor device generated when the target monitor device entered the mid-level sleep mode.

In some cases, one or more of the queued messages received may be "help find messages" that each include a request to wake-up at a defined time in the future. Such a help find message may be sent by an individual that is looking for the target monitor device and indicates a time in the future when the individual expects to be in the area looking for the target monitor device. As such, an individual looking for the target monitor device can send a help find message indicating a time that they will be in the area of the target monitor device, go to the area of the target monitor device at the time indicating in the help find message, and rely upon the physically discernable signals generated by the target monitor device as an aid to finding the target monitor device.

Recovery protocol control 1950 determines whether a help find message has been received. Where a help find message has been received, the wake-up application/circuit of recovery protocol control 1950 is programmed to wake-up target monitor device 120 at the time indicated in the help find message (i.e., the defined wake-up time in the target monitor device is programmed to be the time in the help find message). After either processing the help find message or after determining that no help find message was received, recovery protocol control 1950 causes target monitor device 120 to return to the low-level sleep mode.

Alternatively, where the defined wake-up period has not expired and the defined wake-up time has arrived, recovery protocol control 1950 causes target monitor device 120 to enter a high level sleep mode. In the high level sleep mode, target monitor device sets the defined wake-up time to NULL, and receives and processes an queued messages from central monitoring system 160. In the high level sleep mode one or both of an audio alert and/or a visual alert is These alerts are generated by one or both of the audio alert circuit and/or the visual alert circuit included as part of recovery protocol control 1950. This alert process continues for a programmed period of time (i.e., an alert period) indicated by an alert timer. Once the alert timer expires, recovery protocol control 1950 causes target monitor device 120 to return to the low-level sleep mode.

Controller circuit 127 of target monitor device 120 at times functions in conjunction with cellular transceiver 128 to send and receive data and signals through cellular communication system 150. This link at times is useful for passing information and/or control signals between a central monitoring system (not shown) and multi-purpose monitoring device 120. The information transmitted may include, but is not limited to, location information, alcohol information, and information about the status of multi-purpose monitoring device 120. Based on the disclosure provided herein, one of ordinary skill in the art will recognize a variety of information that may be transferred via cellular communication system 150. Controller circuit 127 of target monitor device 120 at times functions in conjunction with a WiFi transceiver 1992 to transmit and receive communications and/or signals via a WiFi network (not shown). Controller circuit 127 of target monitor device 120 at times functions in conjunction with a low energy BlueTooth™ transceiver 1993 to transmit and receive communications and/or signals via a BlueTooth™ network (not shown).

Various embodiments of target monitor device 120 include a variety of sensors capable of determining the status of target monitor device 120, and of the individual associated therewith. For example, a status monitor 126 may include one or more of the following subcomponents: a power status sensor 156 capable of indicating a power status of target monitor device 120. The power status may be expressed, for example as a percentage of battery life remaining. Based upon the disclosure provided herein, one of ordinary skill in the art will recognize a variety of forms in which power status may be expressed. In addition, target monitor device 120 includes a set of shielding sensors 129 that are capable of determining whether target monitor device 120 is being shielded from receiving GPS signals and/or if GPS jamming is ongoing, a set of device health indicators 154, a tamper sensor 151 capable of determining whether unauthorized access to target monitor device 120 has occurred or whether target monitor device 120 has been removed from an associated human subject 110, a motion/proximity sensor 152 capable of determining whether target monitor device 120 is moving and/or whether it is within proximity of an individual associated with target monitor device 120, and/or an alcohol sensor 153 such as that described herein. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into target monitor device 120 according to various different instances and/or embodiments.

Figure 1C:
FIG. 1c shows a target monitor device including intercept processing support in accordance with one or more embodiments.

Turning to FIG. 1c, one implementation 196 of a combination of target monitor device 120 and strap 190 is shown in accordance with one or more embodiments.

Figure 2:
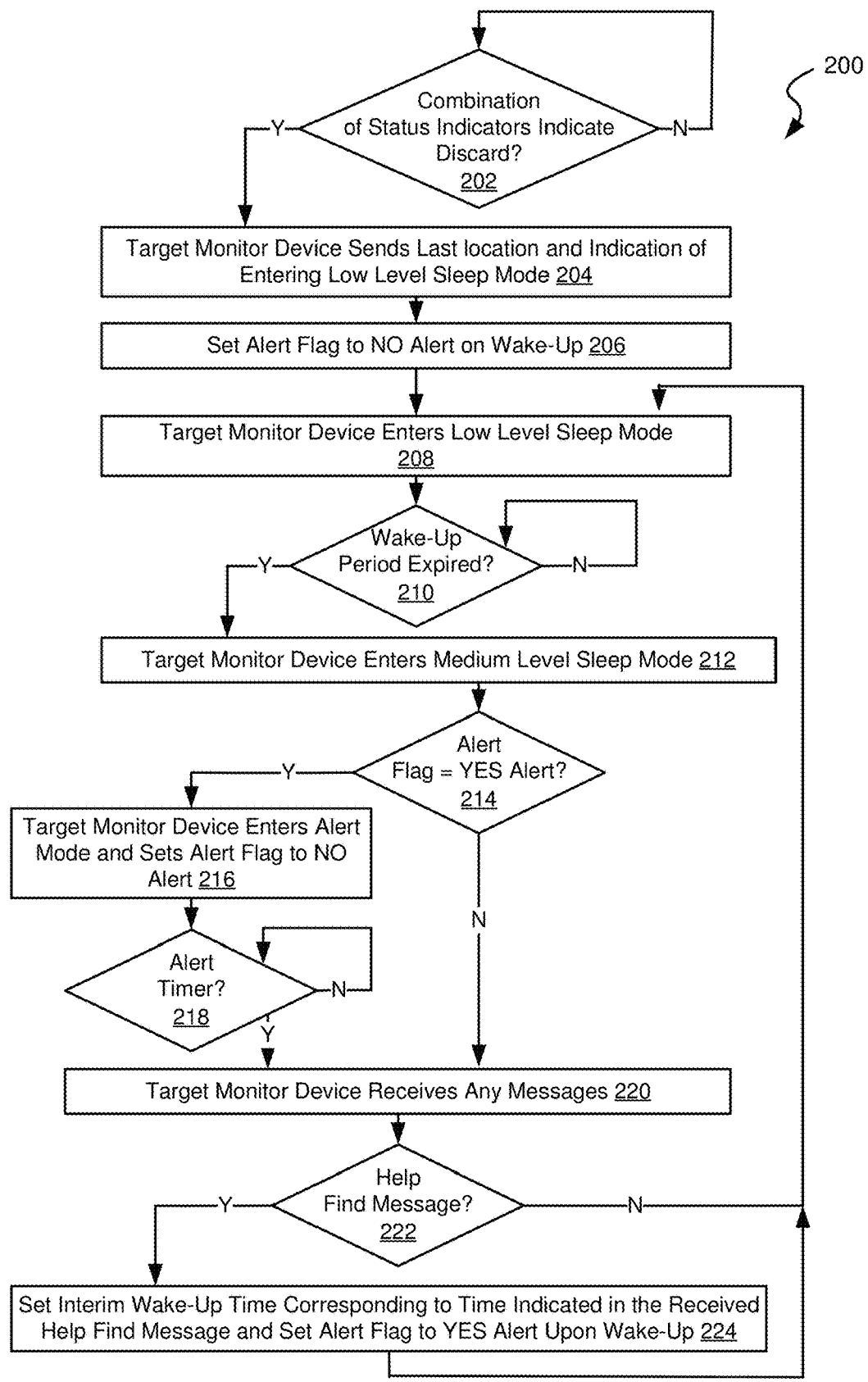
FIG. 2 is a flow diagram depicting a method for identifying the location of a monitoring device in accordance with some embodiments.

Turning to FIG. 2, a flow diagram 200 depicts a method for identifying the location of a discarded target monitor device. Following flow diagram 200, it is determined whether a target monitor device has been detached from a monitored individual (block 202). This may be determined based upon one or more status sensors included in the target monitor device. In one embodiment, a monitoring device is considered detached and discarded when the target monitor device has not moved for a defined period and that prior to the defined period a tamper sensor had reported tampering.

Based upon the disclosure provided herein, one of ordinary skill in the art will recognize a variety of sensor outputs and/or combinations thereof that may be used to indicate detachment and/or discarding of the target monitor device.

Once it is determined that the target monitor device has been detached/discarded (block 202), the target monitor device sends a message reporting its last location and indicating that the target monitor device is entering a low level sleep mode (block 204). This last location may be that which was calculated, for example, based upon information from satellites. Alternatively, this last location may be that which was calculated based upon beacons or WiFi signals. This last location information is transmitted to a central monitoring system along with the various status (e.g., a tamper and/or lack of movement) that was used to establish that the target monitor device had been discarded and other information identifying the target monitor device.

The low level sleep mode is a power saving mode where all but functionality necessary to recover the target monitor device is turned off. In one embodiment, in the low level sleep mode only a timer and a wake-up circuit remain operational. The timer and a wake-up application/circuit are used to periodically raise the low level sleep mode to a medium level sleep mode as more fully described below. In one particular embodiment, the timer and a wake-up application/circuit cause the target monitor device to transition from the low level sleep mode to the medium level sleep mode upon expiration of a defined wake-up period (e.g., once every twenty-four hours or once every four hours). Based upon the disclosure provided herein, one of ordinary skill in the art will recognize a variety of defined wake-up periods that may be used to transition from the low level sleep mode to the medium level sleep mode. The medium level sleep mode energizes message receiving and processing functionality of the target monitor device such that a message indicating a time in the future when the target monitor device is to awake and generate audio and/or visual alerts as more fully described below.

In addition to sending the last location (block 204), the target monitor device sets an alert flag to NO Alert upon wake-up (block 206). The alert flag indicates whether the target monitor device will generate either or both of an audio or visual alert upon the next transition out of the low level sleep mode. Where the alert flag is set to NO Alert upon wake-up, the next transition from the low level sleep mode will be to the medium level sleep mode upon expiration of the aforementioned defined wake-up period. In contrast, where the alert flag is set of YES Alert upon wake-up, the next transition from the low level sleep mode will be to the medium level sleep mode and from there will engage alert functionality of the target monitor device.

Once the last location has been sent (block 204) and the alert flag has been set to NO Alert upon wake-up (block 206), the target monitor device enters the low level sleep mode (block 208). Again, when in the low level sleep mode, almost all functions of the target monitor device are disabled to preserve battery power. One of the only functions that remain operational in the low level sleep mode is the timer and wake-up application/circuit designed to wake the target monitor device up from the low level sleep mode upon expiration of the defined wake-up period or at the defined wake-up time.

The timer and wake-up application/circuit continuously determines whether the defined wake-up period has expired or if the defined wake-up time has arrived (block 210). Once the defined wake-up period has expired or the defined wake-up time has arrived (block 210), the target monitor device transitions from the low level sleep mode to the medium level sleep mode (block 212). Where neither the defined wake-up period has expired nor the defined wake-up time has arrived (block 210), the target monitor device is maintained in the low-level sleep mode.

Otherwise, where either the defined wake-up period has expired or the defined wake-up time has arrived (block 210), the target monitor device enters the medium level sleep mode (block 212). In this medium level sleep mode the target monitor device is capable of updating its location, sending a message indicating the updated location to the central monitoring system where the updated location has changed significantly from the last sent location, and receiving a message from a central monitoring system. In addition, in this mid-level sleep mode the target monitor device is able to determine if the alert flag is set to NO Alert upon wake-up or to YES Alert upon wake-up (block 214).

Where the flag is set to YES Alert upon wake-up (block 214), the target monitor device enters an alert mode and resets the alert flag to NO Alert (block 216). An alert timer is started and until the alert timer expires (block 218), the target monitor device remains in the alert mode. While in the alert mode (block 218) the target monitor device generates one or more physically discernable signals including, but not limited to, an audio signal and/or a visual signal. Such physically discernable signals make it easier for someone that is looking for the target monitor device to find the target monitor device. Such audio and/or visual alerts allow a person in the area to more easily locate and recover the discarded monitor device.

Once the alert timer has expired (block 218) or where the alert flag was not originally set to YES Alert (block 214), the target monitor device receives any queued messages from the central monitoring system (block 220). Such queued messages may be, for example, sent from a central monitoring system that continually attempts to send the messages until a receipt confirmation is received back from the monitoring station. Once the target monitor device receives the message(s) it sends a confirmation to the central monitoring station indicating receipt of the message. In some cases, this confirmation is sent along with an updated location of the target monitor device generated when the target monitor device entered the mid-level sleep mode.

In some cases, one or more of the messages received may be "help find messages" that each include a request to wake-up at a defined time in the future. Such a help find message may be sent by an individual that is looking for the target monitor device and indicates a time in the future when the individual expects to be in the area looking for the target monitor device. As such, an individual looking for the target monitor device can send a help find message indicating a time that they will be in the area of the target monitor device, go to the area of the target monitor device at the time indicating in the help find message, and rely upon the physically discernable signals generated by the target monitor device as an aid to finding the target monitor device.

It is determined whether a help find message has been received (block 222). Where a help find message has been received (block 222), the wake-up timer is programmed to wake-up the target monitor device at the time indicated in the help find message (i.e., the defined wake-up time in the target monitor device is programmed to be the time in the help find message) (block 224). In addition, the alert flag is set to YES Alert for the timer value that awakens the target monitor device so that when the target monitor device awakes it will go into alert mode where the physically discernable signals are generated. After either processing the help find message (block 224) or after determining that no help find message was received (block 222), the target monitor device is returned to the low-level sleep mode (block 208) and the processes of blocks 210-224 are repeated.

Figure 3:
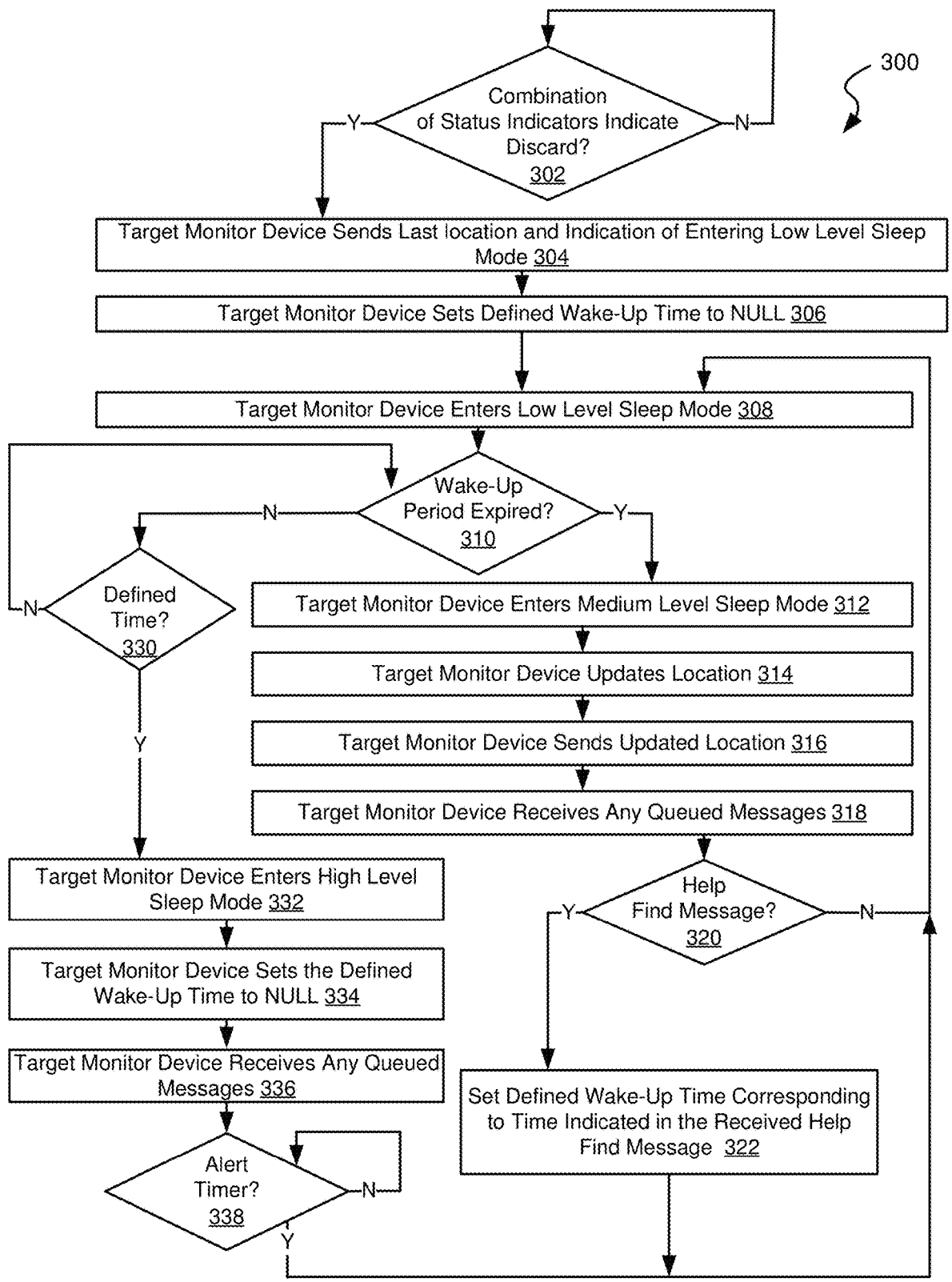
FIG. 3 is a flow diagram 300 showing a method for identifying the location of a discarded target monitor device in accordance with various embodiments.

Turning to FIG. 3, a flow diagram 300 depicts a method for identifying the location of a discarded target monitor device. Following flow diagram 300, it is determined whether a target monitor device has been detached from a monitored individual (block 302). This may be determined based upon one or more status sensors included in the target monitor device. In one embodiment, a monitoring device is considered detached and discarded when the target monitor device has not moved for a defined period and that prior to the defined period a tamper sensor had reported tampering. Based upon the disclosure provided herein, one of ordinary skill in the art will recognize a variety of sensor outputs and/or combinations thereof that may be used to indicate detachment and/or discarding of the target monitor device.

Once it is determined that the target monitor device has been detached/discarded (block 302), the target monitor device sends a message reporting its last location and indicating that the target monitor device is entering a low level sleep mode (block 304). This last location may be that which was calculated, for example, based upon information from satellites. Alternatively, this last location may be that which was calculated based upon beacons or WiFi signals. This last location information is transmitted to a central monitoring system along with the various status (e.g., a tamper and/or lack of movement) that was used to establish that the target monitor device had been discarded and other information identifying the target monitor device.

The low level sleep mode is a power saving mode where all but functionality necessary to recover the target monitor device is turned off. In one embodiment, in the low level sleep mode only a timer and a wake-up circuit remain operational. The timer and a wake-up application/circuit are used to periodically raise the low level sleep mode to a medium level sleep mode as more fully described below. In one particular embodiment, the timer and a wake-up application/circuit cause the target monitor device to transition from the low level sleep mode to the medium level sleep mode upon expiration of a defined wake-up period (e.g., once every twenty-four hours or once every four hours); or from the low level sleep mode to a high level sleep mode when a defined wake-up time has arrived. Based upon the disclosure provided herein, one of ordinary skill in the art will recognize a variety of defined wake-up periods that may be used to transition from the low level sleep mode to the medium level sleep mode. The medium level sleep mode energizes message receiving and processing functionality of the target monitor device such that a message indicating a time in the future when the target monitor device is to awake and generate audio and/or visual alerts as more fully described below. The high level sleep mode energizes the capability of the medium level sleep mode and in addition energizes audio and/or alert functionality such that audio and/or visual alerts are generated by the target monitor device.

In addition to sending the last location (block 304), the target monitor device sets the defined wake-up time to NULL (block 306). With the defined wake-up time set to NULL, the target monitor device will not transition from the low level sleep mode to the high level sleep mode.

Once the last location has been sent (block 304) and the defined wake-up time set to NULL (block 306), the target monitor device enters the low level sleep mode (block 308). Again, when in the low level sleep mode, almost all functions of the target monitor device are disabled to preserve battery power. One of the only functions that remain operational in the low level sleep mode is the timer and wake-up application/circuit designed to wake the target monitor device up from the low level sleep mode upon expiration of the defined wake-up period or at the defined wake-up time.

The timer and wake-up application/circuit continuously determines whether the defined wake-up period has expired (block 310). Once the defined wake-up period has expired (block 310), the target monitor device transitions from the low level sleep mode to the medium level sleep mode (block 312). Alternatively, where the defined wake-up period has not expired (block 310), it is determined by the timer and wake-up application/circuit whether the defined wake-up time has arrived (block 330). Where the defined wake-up time is set to NULL, it is never achieved. Where neither the defined wake-up period has expired (block 310) nor the defined wake-up time has arrived (block 330), the target monitor device is maintained in the low-level sleep mode.

Otherwise, where the defined wake-up period has expired (block 310), the target monitor device enters the medium level sleep mode (block 312). In this medium level sleep mode, the target monitor device is capable of updating its location and does so (block 314). In addition, the target monitor device sends a message indicating the updated location to the central monitoring system where the updated location has changed significantly from the last sent location (block 316), and receives any previously queued messages from a central monitoring system (block 318). Such queued messages may be, for example, sent from a central monitoring system that continually attempts to send the messages until a receipt confirmation is received back from the monitoring station. Once the target monitor device receives the message(s) it sends a confirmation to the central monitoring station indicating receipt of the message. In some cases, this confirmation is sent along with an updated location of the target monitor device generated when the target monitor device entered the mid-level sleep mode.

In some cases, one or more of the queued messages received may be "help find messages" that each include a request to wake-up at a defined time in the future. Such a help find message may be sent by an individual that is looking for the target monitor device and indicates a time in the future when the individual expects to be in the area looking for the target monitor device. As such, an individual looking for the target monitor device can send a help find message indicating a time that they will be in the area of the target monitor device, go to the area of the target monitor device at the time indicating in the help find message, and rely upon the physically discernable signals generated by the target monitor device as an aid to finding the target monitor device.

It is determined whether a help find message has been received (block 320). Where a help find message has been received (block 320), the wake-up timer is programmed to wake-up the target monitor device at the time indicated in the help find message (i.e., the defined wake-up time in the target monitor device is programmed to be the time in the help find message) (block 322). After either processing the help find message (block 322) or after determining that no help find message was received (block 320), the target monitor device is returned to the low-level sleep mode (block 308) and the processes of blocks 310-338 are repeated.

Alternatively, where the defined wake-up period has not expired (block 310) and the defined wake-up time has arrived (block 330), the target monitor device enters a high level sleep mode (block 332). In the high level sleep mode, the target monitor device sets the defined wake-up time to NULL (block 334), and receives and processes an queued messages from the central monitoring system (block 336). In the high level sleep mode one or both of an audio alert and/or a visual alert is generated by the target monitor device. This alert process continues for a programmed period of time (i.e., an alert period) indicated by an alert timer (block 338). Once the alert timer expires (block 338), the target monitor device is returned to the low-level sleep mode (block 308) and the processes of blocks 310-338 are repeated.

Figure 4:
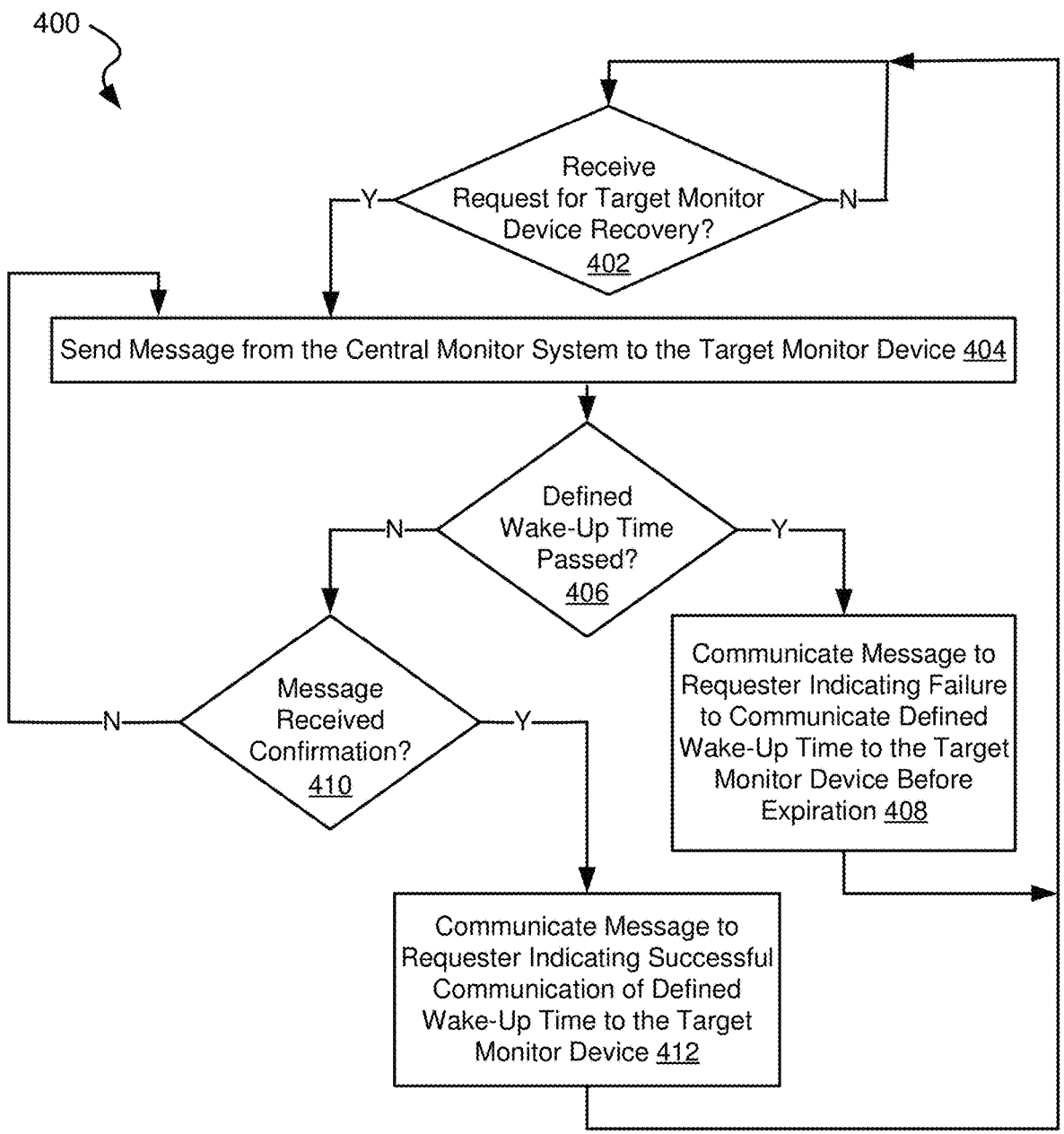
FIG. 4 is a flow diagram showing a method in accordance with some embodiments for queuing a recovery message.

Turning to FIG. 4, a flow diagram 400 shows a method in accordance with some embodiments for queuing a recovery message. Following flow diagram 400, it is determined whether a request for target monitor device recovery has been received (block 402). A request for target monitor device recovery may be received from a user desiring to recover the device. The request includes an indication of the particular target monitor device and a time when the user plans to be in the area of the last reported location of the target monitor device. This request may be received at a central monitoring system.

The central monitoring system sends a message to the identified target monitor device (block 404). The message is a "help find message" that includes a request to wake-up at the time indicated in the request for target monitor device recovery. It is determined whether the time indicated in the request for target monitor device recovery has passed (block 406). Where the time indicated in the request for target monitor device recovery has passed (block 406), it is too late to meaningfully use the alert functionality of the target monitor device. As such, a message is communicated to the requester indicating the failure to communicate the defined wake-up time to the target monitor device before the defined wake-up time (block 408), and the message to the target monitor device is de-queued (i.e., not resent to the target monitor device) (block 404).

Alternatively, where the time indicated in the request for target monitor device recovery has not passed (block 406), it is determined whether a confirmation of the message has been received from the target monitor device (block 410). Where the confirmation has not been received (block 410) the message is re-sent (block 404) and the processes of blocks 406-412 are repeated. Alternatively, where the a confirmation of the message has been received from the target monitor device (block 410) a message it communicated to the requester indicating that the target monitor device should generate an audio and/or visual alert at the time indicated in the request for target monitor device recovery (block 412). At this juncture, the message to the target monitor device is de-queued (i.e., not resent to the target monitor device) (block 404).

In conclusion, various embodiments provide for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for recovering a discarded tracking device, the method comprising:
   receiving, by a target monitor device, a message including a defined wake-up time;
   storing, by the target monitor device, the defined wake-up time;
   entering, by the target monitor device, a low level power mode, wherein in the low level power mode the target monitor device maintains a timer; and
   upon the timer indicating the defined wake-up time has arrived, causing an alert circuit to generate an alert signal.

2. The method of claim 1, wherein the alert circuit includes a speaker, and wherein the alert signal is an audio signal.

3. The method of claim 1, wherein the alert circuit includes a light, and wherein the alert signal is a visual signal.

4. The method of claim 1, wherein the alert circuit includes both a speaker and a light, and wherein the alert signal includes both a visual signal and an audio signal.

5. The method of claim 1, the method further comprising:
   periodically transitioning, by the target monitor device, from the low level power mode to an additional power mode; and
   while in the additional power mode, receiving, by the target monitor device, messages from a central monitoring system.

6. The method of claim 1, wherein the messages from the central monitoring system include the message including a defined wake-up time.

7. The method of claim 5, wherein a period at which the target monitor device transitions from the low level power mode to the additional power mode is selected from a group consisting of: twenty-four hours, and four hours.

8. The method of claim 1, the method further comprising:
   receiving, by a processing resource, a request for target monitor device recovery at a central monitoring station, wherein the request for target monitor device recovery includes the defined wake-up time; and
   sending, by the processing resource, the message including the defined wake-up time to the target monitor device.

9. A system for recovering a discarded tracking device, the system comprising:
   a target monitor device including:
   a processing resource;
   an alert circuit; and
   a non-transitory computer readable medium coupled to the processing resource, wherein the non-transitory computer readable medium has stored thereon instructions that when executed by the processing resource cause the processing resource to:
   receive a message including a defined wake-up time;
   store the defined wake-up time;
   enter a low level power mode, wherein in the low level power mode the target monitor device maintains a timer; and
   upon the timer indicating the defined wake-up time has arrived, causing the alert circuit to generate an alert signal.

10. The system of claim 9, wherein the alert circuit includes a speaker, and wherein the alert signal is an audio signal.

11. The system of claim 9, wherein the alert circuit includes a light, and wherein the alert signal is a visual signal.

12. The system of claim 9, wherein the alert circuit includes both a speaker and a light, and wherein the alert signal includes both a visual signal and an audio signal.

13. The system of claim 9, wherein the system further includes a central monitoring system, and wherein the non-transitory computer readable medium further has stored thereon instructions that when executed by the processing resource cause the processing resource to:
- periodically transition from the low level power mode to an additional power mode; and
- while in the additional power mode, receive messages from the central monitoring system.

14. The system of claim 13, wherein the messages from the central monitoring system include the message including a defined wake-up time.

15. The system of claim 13, wherein a period at which the target monitor device transitions from the low level power mode to the additional power mode is selected from a group consisting of: twenty-four hours, and four hours.

16. The system of claim 9, wherein the non-transitory computer readable medium further has stored thereon instructions that when executed by the processing resource cause the processing resource to:
- receive a request for target monitor device recovery at a central monitoring station, wherein the request for target monitor device recovery includes the defined wake-up time; and
- send the message including the defined wake-up time to the target monitor device.

17. A system for recovering a discarded tracking device, the system comprising:
- a central monitoring system, the central control system including:
  - a first processing resource; and
  - a first non-transitory computer readable medium coupled to the first processing resource, wherein the first non-transitory computer readable medium has stored thereon instructions that when executed by the first processing resource cause the first processing resource to:
    - receive a request for target monitor device recovery, wherein the request for target monitor device recovery includes a defined wake-up time; and
    - send a message including the defined wake-up time to a target monitor device;
- the target monitor device, the target monitor device including:
  - a second processing resource;
  - an alert circuit; and
  - a second non-transitory computer readable medium coupled to the second processing resource, wherein the second non-transitory computer readable medium has stored thereon instructions that when executed by the second processing resource cause the second processing resource to:
    - receive the message including the defined wake-up time;
    - store the defined wake-up time;
    - enter a low level power mode, wherein in the low level power mode the target monitor device maintains a timer;
    - upon the timer indicating the defined wake-up time has arrived, transition to an additional power mode that includes causing the alert circuit to generate an alert signal.

18. The system of claim 17, wherein the alert circuit includes both a speaker and a light, and wherein the alert signal includes both a visual signal and an audio signal.

19. The system of claim 1, wherein the first non-transitory computer readable medium further has stored thereon instructions that when executed by the first processing resource cause the first processing resource to:
- repeatedly send the message including the defined wake-up time to the target monitor device until a confirmation of receipt is received from the target monitor device.

20. The system of claim 17, wherein the first non-transitory computer readable medium further has stored thereon instructions that when executed by the first processing resource cause the first processing resource to:
- repeatedly send the message including the defined wake-up time to the target monitor device until either: (a) a confirmation of receipt is received from the target monitor device, or (b) a time derived from the defined wake-up time has passed.

* * * * *